US006777092B1

(12) United States Patent
Hayashi et al.

(10) Patent No.: US 6,777,092 B1
(45) Date of Patent: Aug. 17, 2004

(54) COATING AND MATERIAL FOR FORMING VITREOUS COATING FILM, METHOD OF COATING WITH THE SAME, AND COATER

(75) Inventors: Kazutaka Hayashi, Tokyo-to (JP); Nam-Heun Kim, Tokyo-to (JP); Akira Shirakura, Tokyo-to (JP)

(73) Assignees: Kirin Beer Kabushiki Kaisha, Tokyo-to (JP); The Clean Japan Center Foundation, Tokyo-to (JP)

( * ) Notice: Subject to any disclaimer, the term of this patent is extended or adjusted under 35 U.S.C. 154(b) by 0 days.

(21) Appl. No.: 09/423,606

(22) PCT Filed: Mar. 11, 1998

(86) PCT No.: PCT/JP98/01018

§ 371 (c)(1),
(2), (4) Date: Nov. 12, 1999

(87) PCT Pub. No.: WO98/51752

PCT Pub. Date: Nov. 19, 1998

(30) Foreign Application Priority Data

May 13, 1997 (JP) ........................................ 9-122445

(51) Int. Cl.[7] ........................................ C09K 15/02
(52) U.S. Cl. ................................ 428/429; 106/287.16
(58) Field of Search .................... 106/287.16; 428/429

(56) References Cited

U.S. PATENT DOCUMENTS

| | | | | |
|---|---|---|---|---|
| 3,412,063 A | | 11/1968 | Jarboe et al. | 260/37 |
| 4,073,967 A | | 2/1978 | Sandvig | 427/44 |
| 4,343,857 A | | 8/1982 | Uram, Jr. | 428/336 |
| 4,941,993 A | | 7/1990 | Strehlow et al. | 252/315.6 |
| 5,045,751 A | * | 9/1991 | Numata et al. | 313/479 |
| 5,271,768 A | * | 12/1993 | Morishima et al. | 106/287.16 |
| 5,328,975 A | * | 7/1994 | Hanson et al. | 528/29 |
| 5,500,455 A | * | 3/1996 | Terakawa | 523/161 |
| 5,520,952 A | | 5/1996 | Tanitsu et al. | 427/58 |

FOREIGN PATENT DOCUMENTS

| | | | |
|---|---|---|---|
| EP | 0 524 417 | | 1/1993 |
| EP | 423337 B1 | * | 6/1995 |
| JP | 03055828 A | * | 3/1991 |
| JP | 04362033 A | * | 12/1992 |
| JP | 6-242432 | | 9/1994 |
| JP | 07331172 A | * | 12/1995 |
| JP | 08091856 A | * | 4/1996 |

* cited by examiner

*Primary Examiner*—Sandra M. Nolan
(74) *Attorney, Agent, or Firm*—Oblon, Spivak, McClelland, Maier & Neustadt, P.C.

(57) ABSTRACT

The present invention relates to a a glassy-film forming coating agent, a method of coating a substrate with the a glassy-film forming coating agent, a bottle coated with the glassy-film forming coating agent, and a coating system for coating a substrate with the glassy-film forming coating agent.

6 Claims, 5 Drawing Sheets

COATING AND MATERIAL FOR FORMING VITREOUS COATING FILM, METHOD OF COATING WITH THE SAME, AND COATER

FIELD OF INDUSTRIAL UTILITY

The present invention relates to a coating agent useful for forming a glassy film on a substrate, to a coating method using the same, and to a bottle coated with the coating agent.

Further, the present invention also relates to a coating system useful for forming a glassy film on a substrate.

BACKGROUND OF THE INVENTION

The sol-gel process using as a starting material a solution of an organic or inorganic compound of a metal such as a silicon alkoxide has conventionally been known as one of the methods for manufacturing glass. In this process, the hydrolysis and condensation polymerization reaction of the compound are carried out in the solution to make the solution into a sol in which fine metallic oxide or hydroxide particles are dispersed. The sol is then made into a gel by allowing the reaction to further proceed; the gel is dried to give a porous gel; and this porous gel is heated to produce glass or ceramic. This process is also known as a method for imparting additional values to substrates to manufacture functional glass that can be used as anti-reflecting films or color filters for cathode ray tubes.

A method for forming colored coatings on such objects as glass bottles by employing this sol-gel process has already been disclosed in Japanese Patent Laid-Open Publication No. 178623/1993. According to this publication, a colored filter is obtained by dispersing fine particles of a pigment in a silica gel film by the sol-gel process. In this method, the film to be colored is a silica gel film. Since a silica gel film tends to be cracked when dried, it is difficult to form a film with a thickness in the order of several microns. This method therefore seems to have such a problem that it is necessary to make the concentration of fine organic pigment particles extremely high in order to obtain a deeply colored silica gel film.

*J. Non-cryst. Solid*, 100, 490 (1988) discloses organic-inorganic composites obtained by directly combining organic compounds with inorganic components. The temperature required to calcine the composites is as high as 650° C. It is unfavorable from the economical point of view to reheat once-shaped glassware, substrate, to such a high temperature. There is therefore a demand for a composite that hardens at a lower temperature in a shorter time.

Japanese Patent Laid-Open Publication No. 137737/1990 is directed to the production of organic-inorganic hybrid glass, and discloses a method for manufacturing organic-inorganic hybrid glass that hardens at low temperatures. Organic siloxanes having highly organic nature are used in this method, so that their affinities for glass surfaces seem to be low.

A method using organic silicon compounds is also disclosed in Japanese Patent Laid-Open Publication No. 315849/1995. The main component of organic groups in the organic silicon compounds is phenyl group. Therefore, although coatings containing these organic silicon compounds are excellent in abrasion resistance, it cannot be expected that the coatings harden rapidly.

*Mat. Res. Soc. Symp. Proc.*, Vol. 180, 767 (1990) and Vol. 180, 995 (1990) report organic-inorganic hybrid materials which harden when irradiated with ultraviolet light. However, these literatures are quite silent on the dispersibility of fine particles; this information is necessary for the formation of colored films by the use of fine particles of organic pigments.

Published Japanese Translation No. 501694/1992 of PCT international publication for patent application describes glass containers coated with colored layers. These colored layers are made from organic materials, and, in addition, their thicknesses are as large as 10 micrometers or more. It is therefore difficult to re-use such glass containers as resources. Moreover, cullet of poor quality can only be obtained when these glass containers are crushed.

Accordingly, there has conventionally been demanded a colored organic-inorganic hybrid material which can give a thin film with its thickness in the order of microns being well controlled, in which an organic pigment is dispersed at high dispersibility, which hardens rapidly at low temperatures, which shows high adhesion to glass, and which can make it easy to re-use coated glass as resources; and a glassy-film-coating method using this hybrid material.

SUMMARY OF THE INVENTION

<Summary>

A glassy-film-forming coating agent of the present invention comprises compounds represented by the following general formulae (1), (2) and (3):

$$R^1{}_pSi(OR^2)_{4-p} \quad (1)$$

$$R^2(OSi(OR^2)_2)_qOR^2 \quad (2)$$

$$M(OR^3)_r \quad (3)$$

wherein

- $R^1$ is a polymerizable organic group,
- $R^2$ is an alkyl group having not more than 4 carbon atoms,
- $R^3$ is an alkyl group having not more than 6 carbon atoms,
- p is an integer of 1 to 3,
- q is an integer of 1 to 10,
- M is a trivalent or tetravalent metal ion, and
- r is an integer of 3 or 4 corresponding to the valence of M,
- provided that, when one of the compounds contains two or more $R^1$s, $R^2$s or $R^3$s, they may be the same or different.

A glassy-film-coating method of the present invention comprising:

applying, to a substrate, a coating agent which comprises compounds represented by the following general formulae (1), (2) and (3):

$$R^1{}_pSi(OR^2)_{4-p} \quad (1)$$

$$R^2(OSi(OR^2)_2)_qOR^2 \quad (2)$$

$$M(OR^3)_r \quad (3)$$

wherein

- $R^1$ is a polymerizable organic group,
- $R^2$ is an alkyl group having not more than 4 carbon atoms,
- $R^3$ is an alkyl group having not more than 6 carbon atoms,
- p is an integer of 1 to 3,
- q is an integer of 1 to 10,
- M is a trivalent or tetravalent metal ion, and
- r is an integer of 3 or 4 corresponding to the valence of M,
- provided that, when one of the compounds contains two or more $R^1$s, $R^2$s or $R^3$s, they may be the same or different, and subjecting the coating agent applied to the substrate to irradiation and/or heat treatment.

A coated bottle of the present invention is obtained by applying, to a bottle, substrate, a coating agent which comprises compounds represented by the following general formulae (1), (2) and (3):

$$R^1_pSi(OR^2)_{4-p} \quad (1)$$

$$R^2(OSi(OR^2)_2)_qOR^2 \quad (2)$$

$$M(OR^3)_r \quad (3)$$

wherein $R^1$ is a polymerizable organic group, $R^2$ is an alkyl group having not more than 4 carbon atoms, $R^3$ is an alkyl group having not more than 6 carbon atoms, p is an integer of 1 to 3, q is an integer of 1 to 10, M is a trivalent or tetravalent metal ion, and r is an integer of 3 or 4 corresponding to the valence of M, provided that, when one of the compounds contains two or more $R^1$s, $R^2$s or $R^3$s, they may be the same or different, and subjecting the coating agent applied to the bottle to irradiation and/or heat treatment.

A glassy-film-coating system of the present invention comprises the following units:

(a) a coater for applying, to a substrate, a coating agent comprising compounds represented by the following general formulae (1), (2) and (3):

$$R^1_pSi(OR^2)_{4-p} \quad (1)$$

$$R^2(OSi(OR^2)_2)_qOR^2 \quad (2)$$

$$M(OR^3)_r \quad (3)$$

wherein $R^1$ is a polymerizable organic group, $R^2$ is an alkyl group having not more than 4 carbon atoms, $R^3$ is an alkyl group having not more than 6 carbon atoms, p is an integer of 1 to 3, q is an integer of 1 to 10, M is a trivalent or tetravalent metal ion, and r is an integer of 3 or 4 corresponding to the valence of M, provided that, when one of the compounds contains two or more $R^1$s, $R^2$s or $R^3$s, they may be the same or different, and (b) a coating-hardening unit for irradiating and/or heating the coating agent applied to the substrate.

<Effects>

The coating agent of the present invention can give a thin film having sufficiently high flexibility with its thickness in the order or microns being well controlled. Moreover, in the case where an organic pigment is incorporated into the coating agent, it shows high dispersibility. In addition, the coating agent gives a vitreous film that hardens rapidly at low temperatures.

DETAILED DESCRIPTION OF THE INVENTION

<Glassy-Film-Forming Components>

Figure 1:
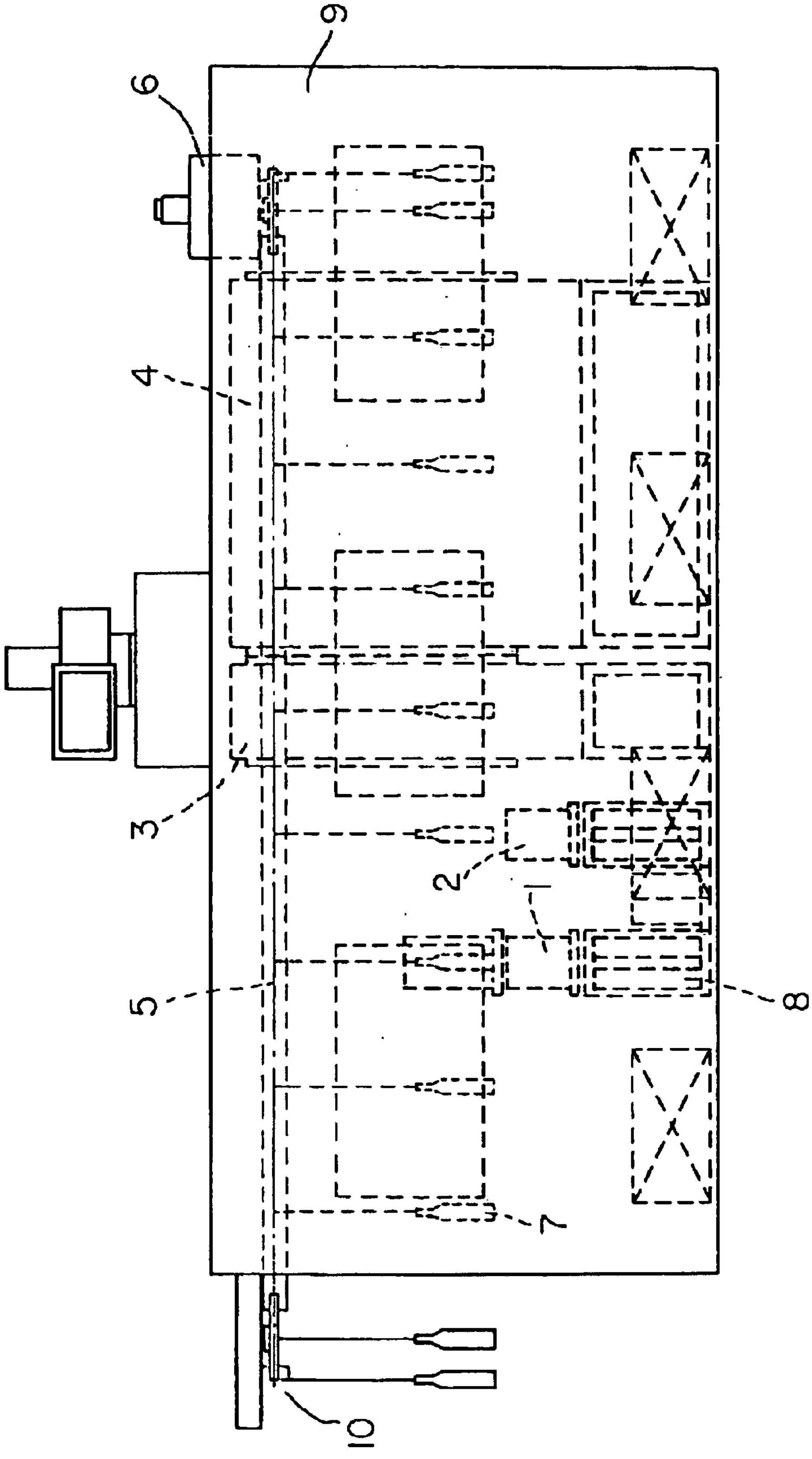
FIG. 1 is an elevation showing an example of the glassy-film-coating system according to the present invention.

The coating agent of the present invention comprises compounds represented by the following general formulae (1), (2) and (3):

$$R^1_pSi(OR^2)_{4-p} \quad (1)$$

$$R^2(OSi(OR^2)_2)_qOR^2 \quad (2)$$

$$M(OR^3)_r \quad (3)$$

wherein $R^1$ is a polymerizable organic group, $R^2$ is an alkyl group having not more than 4 carbon atoms, $R^3$ is an alkyl group having not more than 6 carbon atoms, p is an integer of 1 to 3, q is an integer of 1 to 10, M is a trivalent or tetravalent metal ion, and r is an integer of 3 or 4 corresponding to the valence of M, provided that, when one of the compounds contains two or more $R^1$s, $R^2$s or $R^3$s, they may be the same or different.

The compound represented by general formula (1) is an alkoxysilane compound having a polymerizable organic group $R^1$. The polymerizable organic group herein means an organic group having unsaturated double bond or a ring-opening cyclic group that is cleaved to cause addition or polyaddition reaction repeatedly. Examples of such polymerizable organic groups include vinyl, 2-propenyl, isopropenyl, acryloyl, methacryloyl and γ-methacryloxypropyl groups as groups having polymerizable unsaturated double bond; and cyclic ether groups, especially cyclic monoether groups, and lactone, lactam, acid anhydride and isocyanate (and hydroxyl) groups as ring-opening cyclic groups. Of these, vinyl and γ-methacryloxypropyl groups are preferred.

Of these compounds, vinyl trimethoxysilane, vinyl triethoxysilane, and γ-methacryloxypropyl trimethoxysilane are specifically preferred. Further, a plurality of these compounds may be used in combination.

The alkoxysilane compound represented by general formula (2), combined with the compound of general formula (1), shows the effect of imparting, to the resulting matrix material, an affinity for the surface of a substrate.

Any compound can be used as this compound as long as it has general formula (2), and tetramethoxysilane and tetraethoxysilane are particularly preferred. When it is unfavorable to use these monomers from the viewpoint of safety, polymerizable silicates, specifically "Ethyl Silicate 40 (Trademark)" or "Methyl Silicate 51 (Trademark)" manufactured by Mitsubishi Chemical Industries, Ltd., Japan may be used.

The compound represented by general formula (3) has the effect of enhancing the hardness of a film to be formed by the matrix material, the effect of accelerating the hardening of the film, and the effect of imparting alkali resistance to the finally obtainable glassy film.

In general, a trivalent or tetravalent metal ion is used as the metal ion in the compound of general formula (3). Ti, Zr or Al is particularly preferred as the metal ion.

When $R^2$ or $R^3$ in general formulae (1) to (3) has an excessively large number of carbon atoms, it tends to remain as an impurity in the hardened matrix finally obtained, or the coating film hardened shows impaired resistance to organic solvents. It is therefore preferable that $R^2$ has not more than 2 carbon atoms and that $R^3$ has not more than 4 carbon atoms.

The aforementioned compounds are mixed by one of conventional means to give a matrix material. The matrix material is generally obtained by mixing the compounds as they are when they are liquids, or after dissolving or dispersing the compounds in a proper solvent when they are solids, optional additives being added as needed. Alternatively, after mixing the compounds in the solid state, the mixture may be dissolved or dispersed in a proper solvent. The solvent herein used is selected depending upon the type of the compounds to be used, the type of the pigment to be used, and the dispersion conditions. In general, however, the solvent is ethanol, propanol, butanol or the like. From the viewpoint of pigment-dispersing properties, butanol is preferred as the solvent. To obtain a frosty vitreous coating (the details will be described later), it is preferable to use ethanol as the solvent.

These compounds (1), (2) and (3) may be mixed in any proportion. In general, however, they are mixed in the following proportions:

compound (1): 40 to 80 mol %, compound (2): 10 to 30 mol %, and compound (3): 5 to 50 mol %.

It is more preferable to mix compounds (1), (2) and (3) in the following proportions:

compound (1): 65 to 75 mol %, compound (2): 15 to 25 mol %, and compound (3): 5 to 20 mol %.

When the percentages of these compounds are not within the above-described ranges, the resulting coating agent tends to have an excessively high viscosity, to show poor adhesion to a substrate, or to give a film whose hardness is not sufficiently high.

<Polymerization Initiator>

It is preferable that the glassy-film-forming coating agent of the present invention further comprises a polymerization initiator.

The glassy-film-forming coating agent of the present invention is composed of the above-described matrix material, and, when the organic components of the matrix material are polymerized, a film whose hardness is higher than that of a film composed of siloxane bond only is formed more rapidly. At this time, the polymerization initiator serves to make the polymerization of the matrix material proceed efficiently and uniformly.

In the present invention, any polymerization initiator selected from, for example, photopolymerization initiators, radical polymerization initiators and thermal polymerization initiators can be used as long as it is suitable for the mechanism of polymerization of a given polymerizable organic group and does not mar the effects of the present invention. Of these initiators, photopolymerization initiators are preferred. Specific examples of useful initiators include benzophenone, 1-hydroxycyclohexyl phenyl ketone, benzoyl peroxide and azoisobutyronitrile.

<Colorant Agent and Dispersant>

The glassy-film-forming coating agent of the present invention may contain a pigment or dye as a colorant for coloring a film to be formed by the matrix material.

Any pigment can be used as long as it can be dispersed in the above-described matrix material and undergoes substantially no decomposition during the heat treatment that is carried out in order to harden the film. Examples of such pigments include phthalocyanine, azo, anthraquinone, durene, quinacridone, perylene, perinone, dioxazine, thioindigo and isoindolinone pigments. Of these, durene and quinacridone pigments are preferred. Further, two or more different types of pigments may be used in combination when necessary. Of these pigments, phthalocyanine pigments, especially copper phthalocyanine (Phthalocyanine Blue) and Phthalocyanine Green are preferred.

In the case where such a pigment is used, it is preferable to use a dispersant in combination with the pigment in order to improve the dispersion stability of the pigment. Examples of useful dispersants include carboxylic-acid-type polymeric dispersants, specifically "Antigel (Trademark)" manufactured by Schwegmann Additives corporation, fluorinated alkyl ester dispersants, specifically "BM1000 (Trademark)" manufactured by Schwegmann Additives Corporation, and high-molecular-weight modified polyester/butyl acetate dispersants, specifically "SW8080 (Trademark)" manufactured by Schwegmann Additives Corporation. Of these, carboxylic-acid-type polymeric dispersants are preferred.

In the case where a pigment and a dispersant are used in combination, they are generally dissolved or dispersed in a solvent; and the solution or dispersion obtained is then added to and dispersed in the aforementioned matrix material by a dispersion mixer. Alternatively, a solution or dispersion obtained by dissolving or dispersing the pigment and dispersant in a solvent may previously be mixed with or dispersed in any of the compounds constituting the matrix material when necessary. Any dispersion mixer may be used. Examples of useful dispersion mixers include pot mills, ball mills, sand mills, ultrasonic dispersion mixers, and homogenizers.

When a pigment is dispersed in the glassy-film-forming coating agent of the present invention, the dispersibility of the pigment in the coating agent can vary depending upon the time elapsed between the completion of preparation of the matrix material and the start of pigment-dispersing operation. However, there can be found almost no change in dispersion stability with time. It is therefore possible to control the dispersibility of the pigment by controlling the time between the completion of preparation of the matrix material and the start of pigment-dispersing operation.

A dye may be used instead of the pigment. For instance, stylbene azo, azo, ketoimine, acrydine and thiazine dyes can be used. When such a dye is used, it is not necessary to use a dispersant.

In the case where a pigment, dye or dispersant is used, it is preferable that it contains no metallic element. This is because a glass substrate such as a glass bottle coated with the glassy-film-forming coating agent of the present invention, containing a pigment, dye or dispersant having no metallic element does not cause serious troubles when it is subjected to recycling. Although inorganic pigments other than the above-described ones, such as zinc or chrome pigments, or organic dyes containing metal ions such as Phthalocyanine Blue or Green can also be used, a special treatment may be required for recycling glass coated with a film containing such a pigment or dye.

<Frictional-Resistance-Reducing Agent>

The glassy-film-forming coating agent of the present invention may contain a frictional-resistance-reducing agent effective for reducing the frictional resistance, particularly the sliding friction, of a film formed by the matrix material. Such a frictional-resistance-reducing agent incorporated into the film serves to decrease the coefficient of sliding frictional resistance of the film surface due to its effects of making the surface of the hardened film smooth, and of imparting proper hardness to the film hardened.

Therefore, by coating a substrate with the glassy-film-forming coating agent of the present invention into which the frictional-resistance-reducing agent has been incorporated, it is possible to reduce the amount of scratches that are produced on the surface of the film when the film is brought into contact with other objects.

Any frictional-resistance-reducing agent can be used in the glassy-film-forming coating agent of the present invention as long as it does not mar the effects of the present invention. For example, modified polysiloxane compounds, specifically "S130 (Trademark)" manufactured by Defra A.G., Germany can be mentioned.

<Polymerizable Monomer>

A polymerizable organic monomer may further be incorporated into the glassy-film-forming coating agent of the present invention in order to modify the matrix material.

When a polymerizable organic monomer is added to the coating agent of the present invention, this polymerizable organic monomer and the polymerizable organic group contained in the coating agent are bonded to each other, so that the nature of the resulting film becomes more organic. It is thus possible to improve the film in surface properties and adhesion to a substrate.

Any polymerizable organic monomer can be used as long as it has a functional group chemically polymerizable with the polymerizable organic group contained in the aforementioned compound (1) and does not mar the effects of the present invention. Examples of useful polymerizable organic monomers include those compounds having unsaturated double bond, specifically methyl acrylate, ethyl acrylate and methyl methacrylate. Of these monomers, methyl methacrylate is preferred.

<Coating Agent>

The coating agent of the present invention comprises the above described compounds (1), (2) and (3), and, optionally, a polymerization initiator, pigment or dye, dispersant, frictional-resistance-reducing agent, polymerizable organic monomer and solvent.

The proportions of these optional components vary depending upon the optional components used in the coating agent, the use of the coating agent, and the like. In general, however, the amount of each component based on the weight of the matrix material, that is, on the total weight of the aforementioned compounds (1) to (3) is as follows. The polymerization initiator is 0.1 parts or less, preferably from 0.001 to 0.02 parts; the pigment or dye is 0.15 parts or less, preferably from 0.02 to 0.5 parts; the dispersant is 0.15 parts or less, preferably from 0.01 to 0.08 parts; the frictional-resistance-reducing agent is 0.2 parts or less, preferably from 0.01 to 0.1 parts; the polymerizable organic monomer is from 0.1 to 1 part, preferably from 0.2 to 0.8 parts; and the solvent is from 0.5 to 100 parts, preferably from 3 to 20 parts.

When the coating agent of the present invention is used, a film with a thickness of approximately 2 to 5 micrometers, free from any defect such as crack can be obtained by applying the coating agent only once. It has been impossible to obtain such a film by applying conventional silica gel. The reason for this may be such that the polymerizable organic group contained in compound (1), one component of the matrix material, has the effect of relaxing the stress accompanied by the shrinkage of the film which is caused during the heating process.

Besides the above-described compounds (1), (2) and (3), polymerization initiator, frictional-resistance-reducing agent, polymerizable organic monomer, pigment or dye, and dispersant, the coating agent of the present invention may contain any additive as long as it does not mar the effects of the present invention. Examples of such additives include diluents, viscosity modifiers, matting agents and smoothing agents.

<Coating Method>

The present invention also relates to a method for applying the foregoing coating agent to a substrate to form thereon a film.

Any material can be used as the substrate to which the coating agent of the present invention is applied as long as it does not undergo modification during the step of hardening. Specific examples of materials useful for the substrate include glass, plastics, ceramics and metals. Of these, glass is particularly preferred. The method of the present invention is effective, for example, for coloring transparent glass substrates. Further, the substrate to be coated with the coating agent may be in any shape; and a substrate in the shape of a plate, a bar, particles, a bottle, a box or the like can be used. Of these, a substrate in the shape of a bottle is particularly preferred because the appearance of packaging can be improved when the coating agent of the present invention is applied to such a substrate.

The glassy-film-coating method of the present invention firstly comprises the step of applying the aforementioned coating material to the above-described substrate.

Any method can be used for applying the coating agent to the substrate; and a dip, spray or curtain coating method, or the like can be employed depending on the shape of the substrate to be coated with the coating agent.

After the application of the coating agent is completed, air may be blown by using, for example, a blower on the film formed before drying the film in order to accelerate the drying of the film. At this time, if a highly hydrophilic solvent is used as a solvent in the coating agent, it is possible to make the surface of the film frosty (the details will be described later). Alternatively, it is possible to give a frosty appearance to the film by controlling the hardening reaction of the film by placing it in an atmosphere rich in water vapor after the application of the coating agent is completed.

Next, the film formed is hardened by means of irradiation and/or heating.

Heating may be conducted by any method, and is generally conducted by using an electric or air-heating furnace. The coating agent of the present invention can give a fully hardened film within one hour when heated at a temperature of generally 60 to 300° C., preferably 120 to 200° C., the temperature varying depending upon the nature of the substrate used.

Further, when the matrix material comprises a compound containing a photopolymerizable organic group, and/or when the coating agent comprises a photopolymerization initiator, it is also possible to harden the film by irradiating it to cause polymerization reaction. In this case, the film is generally irradiated with visible or ultraviolet light, ultraviolet light being preferred. Any light source can be used for the irradiation of the film. Examples of light sources include mercury vapor lamps, xenon discharge tubes, hydrogen discharge tubes, black light lamps, and a variety of laser light sources.

It is possible to harden the film either by irradiation or by heating. It is however preferable to combine these two means in order to shorten the heat treatment time and to impart higher hardness to the film.

In general, the glassy film hardened is then gradually cooled, whereby the coating of the glassy film is completed. There is no particular limitation on the temperature pattern for heating or cooling. It is however common to change the temperature within such a range that the substrate and glassy film undergo any damage.

<Coated Glass Bottle>

The present invention also relates to a coated glass bottle to which the aforementioned glassy-film-forming coating agent has been applied by the above-described coating method.

The coated glass bottle of the present invention is obtained by applying the aforementioned glassy-film-forming coating agent to the surface, preferably the outer surface of a glass bottle, and hardening it. The thickness of the glassy film hardened is generally 1 to 5 micrometers.

Any sort of glass can be used as a substrate. For instance, soda-lime glass, silicate glass, silicate alkaline glass, borosilicate glass and lead glass can be used.

This glassy film is composed of an organic-inorganic hybrid material as mentioned previously. As long as only an organic substance is used as the colorant, the constituents of the glassy film are organic materials including an organic colorant, a dispersant, etc., and silicon compounds. For this reason, when the coated glass bottle is re-melted, the glassy film formed on the surface of the glass bottle is converted into silicon dioxide that is a component of the glass, and carbon dioxide and water derived from the organic substances. The carbon dioxide and water are removed from the system by the heat applied to melt the bottle, so that the resulting melt can be handled equally to a melt consisting of glass alone.

Further, it has been difficult to obtain, from conventional bottles coated with plastics or the like, cullet with quality of standard level. On the contrary, cullet obtained by crushing the coated glass bottle of the present invention meets the qualities required for cullet. Therefore, the coated glass bottle of the present invention collected after use can be re-used by making it into cullet for manufacturing glass bottles.

As mentioned above, when the coated glass bottle of the present invention is coated with a non-colored film or with a film colored by an organic colorant only, it is not necessary to separate the glass bottle from colorless bottles at the time of collection. The efficiency of recycling of glass can thus be improved.

<Frosty Glass Bottle>

In the coated glass bottle of the present invention, the glassy film on the bottle can be made frosty.

A frosty film can be formed in the following manner: after applying the glassy-film-forming coating agent to a substrate, a solvent contained in the coating layer formed is removed before hardening the coating layer in order to cause phase separation inside the coating layer. As a result of this phase separation, a network structure in the order of several micrometers appears on the surface of the film. When the coating layer is separated into two layers by this phase separation, a great difference in the concentration of the coating agent between the two layers is brought about, so that the film is to have a roughened surface after it is dried. The glassy film thus has a frosty appearance.

Easiness of occurrence of this phase separation depends on the degree of removal of the solvent and on the type of the solvent used.

The degree of removal of the solvent is determined by various factors. In order to obtain a glassy film having a frosty appearance, it is preferable to remove the solvent by blowing air by a blower, or by placing the substrate coated with the coating agent under the condition of reduced pressure. The solvent can also be removed by heating. In this case, the substrate coated with the coating agent should be placed under such conditions that the solvent is removed before hardening reaction proceeds. It is also possible to change the frosty appearance by controlling the relative humidity and temperature of air to be blown or of the atmosphere under which the solvent is removed. In this manner, phase separation is caused inside the coating layer.

The solvent is preferably a highly hydrophilic solvent, and methanol or ethanol is more preferred. Ethanol is most preferred from the viewpoint of safety.

The nature of the glassy-film-forming coating agent of the present invention is between the nature of organic substances and that of inorganic substances. For this reason, the solubility of the coating agent in solvent varies depending upon the polymerization degree of monomers. For instance, the solubility of the coating agent in a solvent having relatively low hydrophilicity, such as 1-butanol, is high because the coating agent has organic nature. Therefore, even if the amount of the solvent is decreased during the step of drying, phase separation does not occur easily. On the other hand, when a solvent having a relatively high hydrophilicity, such as methanol or ethanol, is used, phase separation readily occurs during the step of drying. This is because, when the amount of the solvent is decreased during the step of drying, the concentration of the coating agent becomes higher than the solubility of the coating agent in the solvent.

Thus, by removing the solvent contained in the unhardened coating layer to cause phase separation, it is possible to make the appearance of the hardened coating layer frosty. The uneven structure formed on the coating layer due to phase separation is maintained if the coating layer is successively hardened. The uneven structure tends to become flat if the coating layer is not hardened right after the occurrence of phase separation, so that attention should be given to this point.

To produce glass bottles having frosty surfaces, an etching process using hydrofluoric acid, or coating with organic materials such as plastics has conventionally been conducted. On the contrary, it is not necessary to conduct such processing as etching to obtain the frosty glass bottle of the present invention. Moreover, special consideration is not required for the recycling of the bottle that is conducted, for example, by making the bottle into cullet as mentioned previously.

<Coated Plastic Bottle>

The present invention also relates to a plastic bottle coated with the aforementioned glassy-film-forming coating agent by the above-described coating method.

The coated plastic bottle of the present invention is obtained by applying the aforementioned glassy-film-coating agent to the surface, preferably the outer surface of a plastic bottle, and hardening it. The thickness of the glassy film hardened is generally from 1 to 5 micrometers. Since this vitreous film is composed of an organic-inorganic hybrid material, the film shows flexibility, and has such a characteristic that the film is not easily separated from the bottle body even when the plastic bottle is deformed.

On the other hand, since this glassy film is bound to the bottle chiefly by siloxane bond, it is possible to completely separate the film from the coated bottle by washing the bottle with an alkaline washing liquid. Therefore, when a glassy film is formed on a transparent plastic bottle by coating the bottle with the glassy-film-forming coating agent containing a colorant, the plastic bottle can be colored, and, in addition, the colored coating can easily be removed when the plastic bottle is recycled. The coloring of PET bottles, which is restricted in view of the difficulties encountered in the re-use of the bottles as resources, can thus be conducted easily.

The glassy film formed by using the glassy-film-forming coating agent of the present invention is non-porous, so that it can impart improved gas impermeability to plastic bottles, gas impermeability being a weak point of conventional plastic containers.

There is no particular limitation on the type of plastics that can be used for plastic bottles in the present invention. Examples of useful plastics include polyethylene terephthalate, polyethylene naphthalate, polyethylene, polypropylene, polyvinyl chloride and polystyrene. Of these, polyethylene terephthalate is preferred.

<Glassy-Film-Coating System>

The present invention also relates to a glassy-film-coating system utilizing the above-described glassy-film-coating method.

The glassy-film-coating system of the present invention comprises the following units:

(a) a coater for applying the aforementioned coating agent to a substrate; and (b) a coating-hardening unit for irradiating and/or heating the coating agent applied to the substrate.

The system of the present invention firstly comprises a coater for forming a film of a coating agent on a substrate. For the coating agent, the aforementioned coating agent of the present invention is used.

Any coater can be used depending upon the shape of the substrate to be coated with the coating agent. Specific examples of such a coater include dip coaters, spray coaters, and curtain coaters. A dip coater is preferred when a glass bottle is used as the substrate.

To make the appearance of the finally obtainable glassy film frosty, the system of the present invention can further comprise a device for controlling the dryness of the film. For this device, one for accelerating the drying of the film, e.g., a blower or fan, one for controlling the humidity of the film, e.g., a humidifier, or the like can be used depending on the method adopted to obtain a frosty appearance, described in the foregoing "Frosty Glass Bottle".

The system of the present invention comprises a coating-hardening unit for hardening the film of the coating agent formed on the substrate.

The coating-hardening unit may be composed of either one of or both of an irradiator for irradiating the film to cause photopolymerization reaction, thereby hardening the film formed, and a heater for thermally causing polymerization reaction to harden the film. It is however preferable that the coating-hardening unit be composed of these two devices, that is, the irradiator and heater.

An ultraviolet light irradiator is preferred as the irradiator. Specific examples of such an irradiator include mercury vapor lamps, xenon discharge tubes, hydrogen discharge tubes, black light lamps, and a variety of laser light sources.

Although any heater can be used, an electric or air-heating furnace is usually used. It is preferable that the heater can heat the film of the coating agent formed on the substrate to 60 to 300° C., preferably 120 to 200° C.

The glassy-film-coating system of the present invention comprises the above-described two units, and, if necessary, may further comprise a device for cooling the film of the coating agent after heating, and, between the above described two units, a device for carrying the substrate to be coated with the glassy film. The system is usually placed in a high temperature atmosphere, so that it is preferable that a series of these units/devices be automatically controllable.

By referring now to the accompanying drawings, one embodiment of the glassy-film-coating system of the present invention will be described hereinafter.

Figure 2:
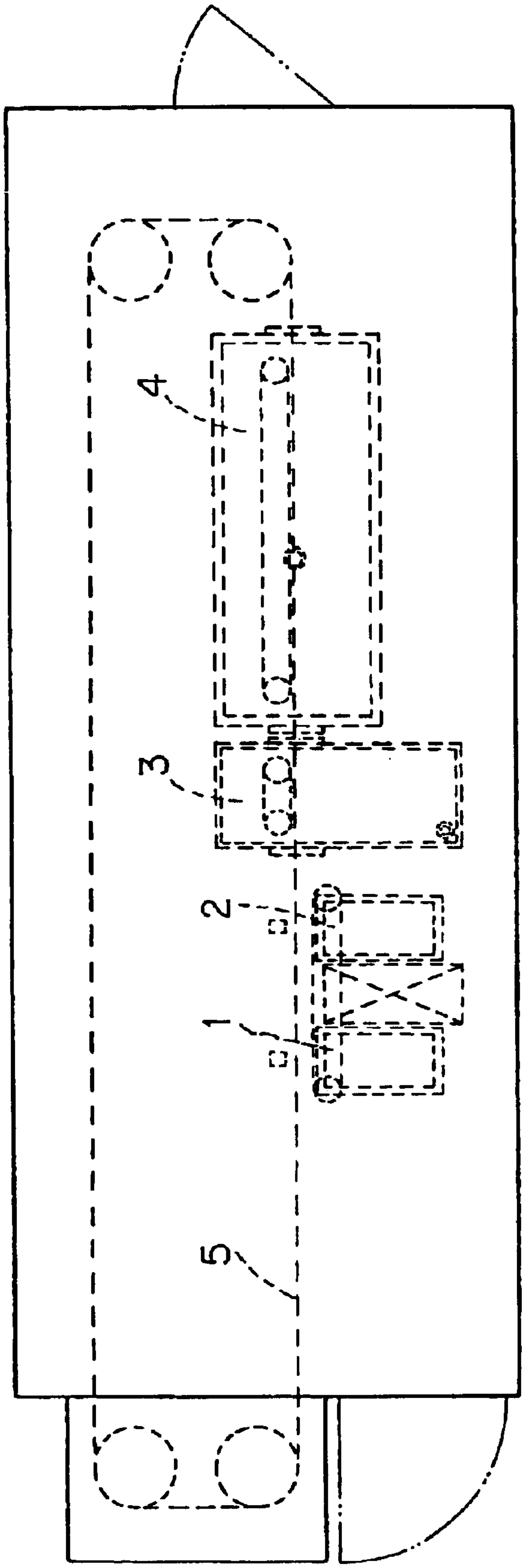
FIG. 2 is a plan of the above glassy-film-coating system according to the present invention.

FIGS. 1 and 2 show an example of the glassy-film-coating system of the present invention.

In the system shown in these figures, a glass bottle 7, substrate, is carried by a conveyer 5 to coating agent baths 1, 2, and then to a coating-hardening unit (an ultraviolet light irradiator 3, and a heater 4). These members are covered with a hood 9 having an opening that exposes a part of the conveyer 5. This opening is used as a take-up part 10. At this part, the glass bottle 7 is attached to the conveyer 5, and the coated glass bottle is detached.

The process of coating is as follows.

The glass bottle 7 is attached to the conveyer at the take-up part 10. The attached glass bottle 7 is carried to the coating agent bath 1, in which the coating agent is applied to the glass bottle. The coater 1 shown in the figures is a dip coater.

Figure 3A:
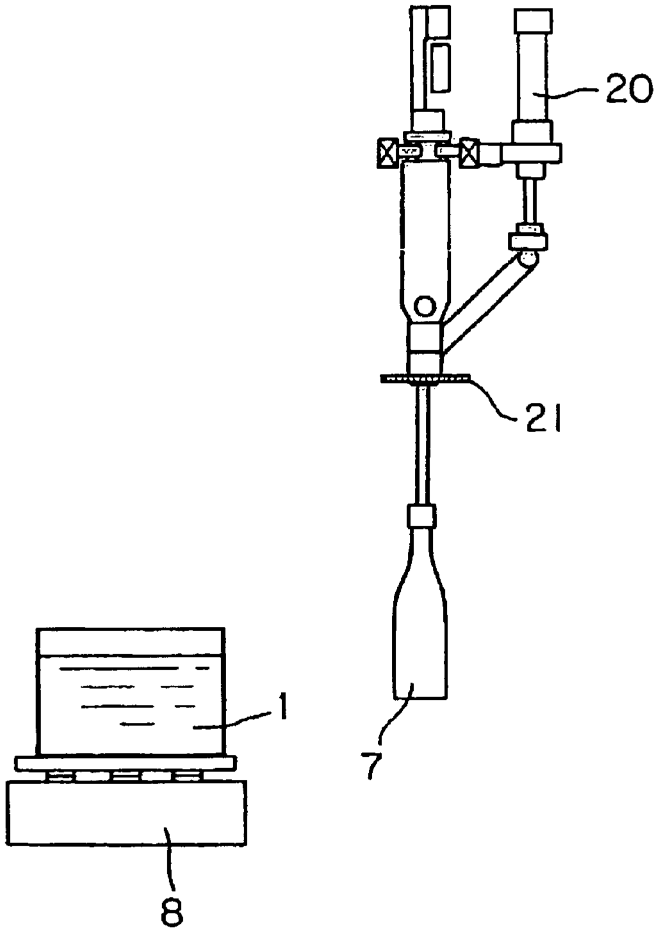
FIGS. 3A and 3B are organization views showing an example of a glass bottle conveyer in the glassy-film-coating system according to the present invention.
Figure 3B:
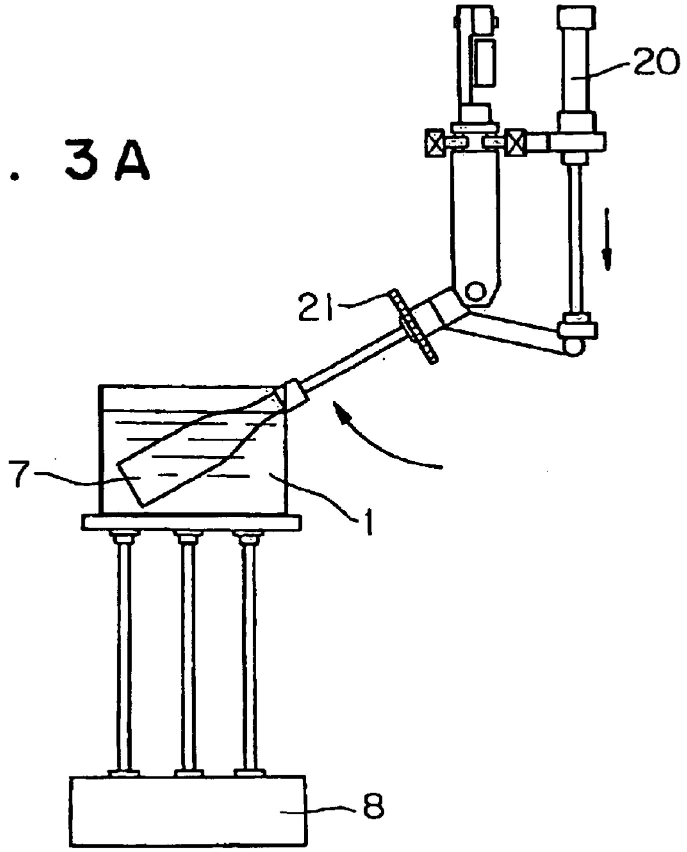

This dip coater is as shown in FIGS. 3A and 3B. The glass bottle 7 that has reached the coating agent bath 1 is raised obliquely by a cylinder 20 attached to the conveyer. The coating agent bath 1 is elevated by a lifter 8 to the lower part of the glass bottle 7 raised, and the glass bottle 7 is thus immersed in the coating agent. The glass bottle immersed is turned around by a motor (not shown in the figures) fitted to a gear 21 attached to the conveyer, whereby the coating agent is uniformly applied to the glass bottle 7. After the application of the coating agent is completed, the coating agent bath is allowed to move downward, and the glass bottle 7 is then carried to the next step.

The coating agent bath may be single; however, a plurality of coating agent baths may be provided as shown in FIGS. 1 and 2. In this case, the coating agents contained in the coating agent baths may be either the same or different.

When the above-described dip coater is used, a concentric pattern may be formed on the film due to running of the excess coating agent. In order to prevent the film from having such non-uniformity, it is possible to use an absorber such as a sponge to absorb the excess coating agent.

Figure 4A:
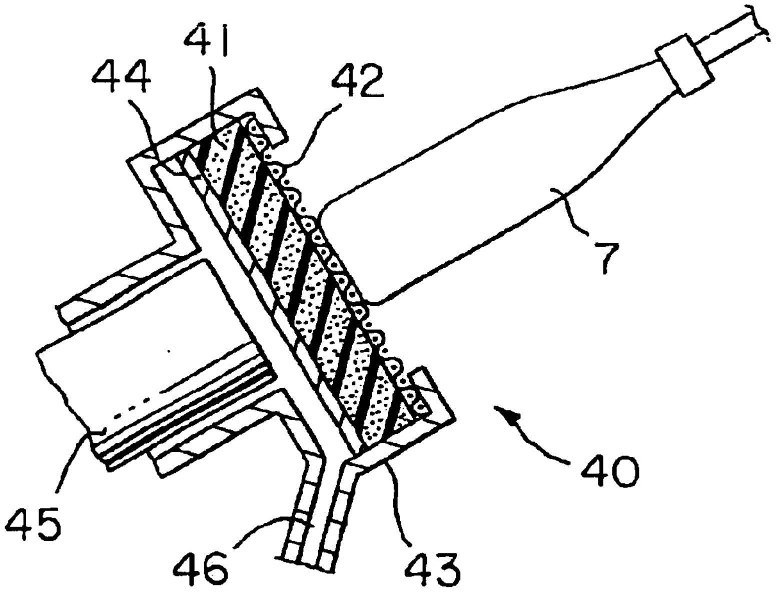
FIGS. 4A, 4B, 5A and 5B are organization views showing an excess-liquid-absorbing device that can be used in the glassy-film-coating system according to the present invention.
Figure 4B:
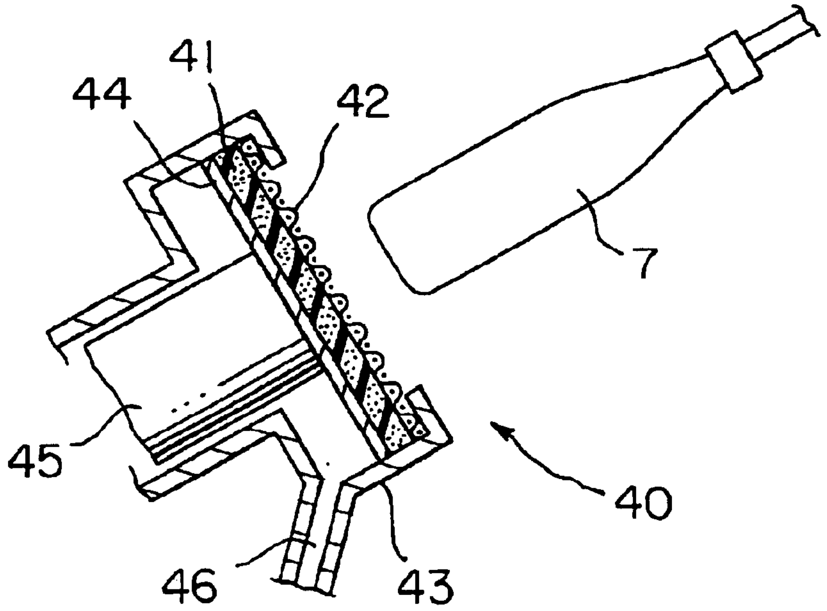

An excess-liquid-absorbing device as shown in FIGS. 4A and 4B, for example, can be mentioned as a device having the above-described function.

In this device, the bottle 7 that has been immersed in the coating liquid is pressed against a sponge 41 so that the sponge can absorb the excess coating agent. The sponge 41 is deformed when the bottle is directly pressed against the sponge 41, so that a concentric pattern may be formed on the film formed on the bottom of the bottle 7. In order to prevent this, a wire-mesh material 42 that is hardly deformed is provided between the bottle 7 and sponge 41 in the device shown in FIG. 4A so that the bottle 7 will not be brought into direct contact with the sponge 41. Moreover, in this device, the wire-mesh material 42 is not fixed to an absorber case 43. Therefore, even if the position of the bottle 7 changes as the coating operation proceeds, the bottom of the bottle is always kept parallel with the wire-mesh material 42. The bottle 7 is preferably being rotated even while the bottle is in contact with the absorber (or wire-mesh material).

In this excess-liquid-absorbing device, the absorber case 43 moves backward after the absorber has absorbed the excess liquid on the bottle 7 for a predetermined period of time. As a result, the smooth movement of the bottle 7 is ensured. The device shown in FIG. 4A further comprises a mechanism for compressing the absorber 41.

Namely, a plate 44 is attached to the back surface of the absorber 41, but not fixed to the absorber case 43. When the absorber case 43 is set back from the position shown in FIG. 4A, the absorber 41 is compressed through the plate 44 by a squeezing cylinder 45 fixed. In this manner, the excess coating agent is recovered at a discharge hole 46. The state of the absorber case 43 at the time when it is set back is as shown in FIG. 4B.

Figure 5A:
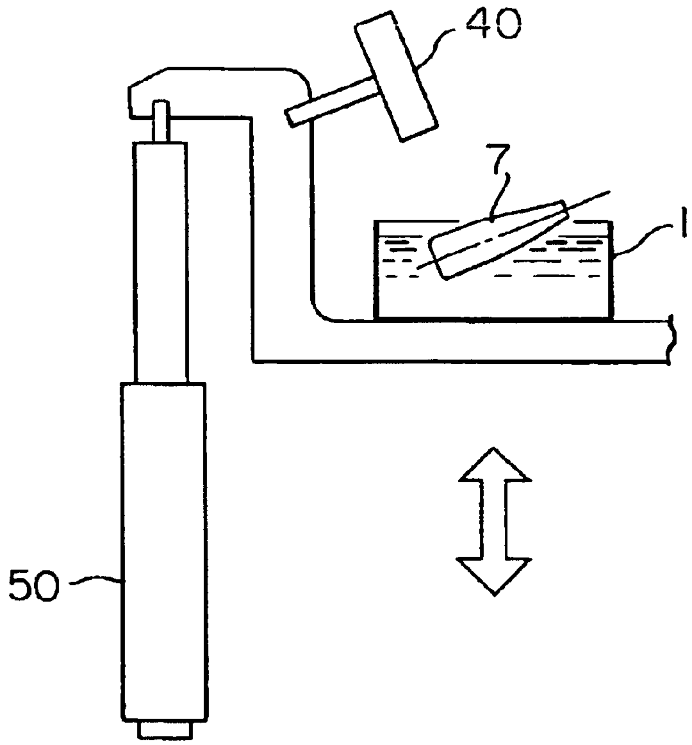
Figure 5B:
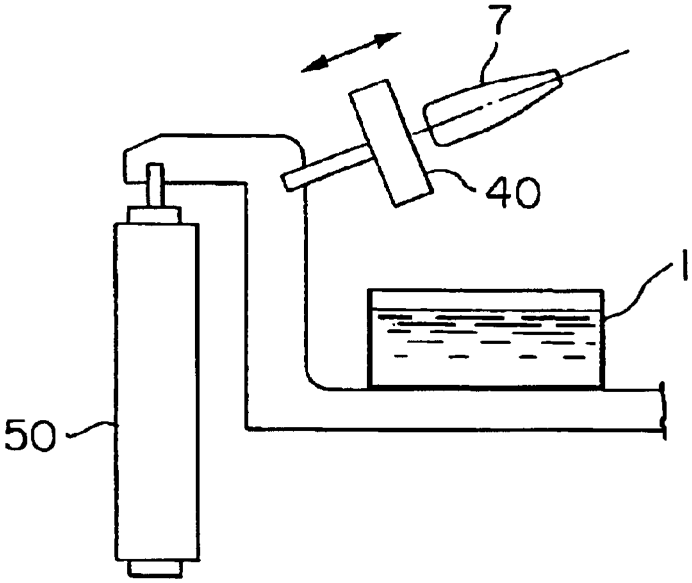

The relation between this excess-liquid-absorbing device 40 and the coater is as shown in FIGS. 5A and 5B. As shown in FIG. 5A, the bottle 7 is immersed in the coating agent contained in the coating agent bath 1. The coating agent bath 1 is then allowed to move downward, so that the relative position of the bottle 7 becomes the upside of the coating agent bath 1 (FIG. 5B). The excess-liquid-absorbing device 40 then moves forward, and comes into contact with the bottom of the bottle 7 to absorb the excess coating agent.

The glass bottle 7 coated with the coating agent is carried to the coating-hardening unit. As shown in FIG. 1, the glass bottle 7 is firstly carried to the ultraviolet light irradiator 3. The ultraviolet light irradiator 3 is equipped with a low-pressure mercury vapor lamp, for example, and the hardening of the film of the coating agent is conducted by using this lamp.

The glass bottle is then carried to the heater 4. The heater 4 is equipped with a far infrared heater, and the atmosphere of the heater is kept at a temperature of approximately 200° C. The film formed on the glass bottle 7 is fully hardened by this heater.

Also in the above coating-hardening unit, it is preferable to rotate the glass bottle 7 by means of a gear 21 or the like. By doing so, a uniformly hardened coating can be obtained.

The glass bottle 7 with the coating film hardened is cooled by air while it is carried to the take-up part 10. The system shown in FIGS. 1 and 2 contains no specific cooler. However, a cooler such as a fan may positively be provided to the system.

EXAMPLES

The present invention will now be explained more specifically by referring to the following examples. The glassy films obtained in the examples were evaluated by the following test methods.

<Organic Solvent Resistance Test>

The organic solvent resistance of each film obtained was evaluated by rubbing the film with a cloth impregnated with acetone, and counting the number of rubbings conducted before the film was damaged.

<Adhesion Test>

The adhesion of the film to the substrate was evaluated in the following manner. The surface of the film was scored to from twenty five 2 mm×2 mm squares, and a cellophane adhesive tape was applied to this surface; after peeling off the adhesive tape, the number of the squares remaining on the substrate was counted.

<Light Resistance Test>

The light resistance of the colored film was evaluated by placing the bottle coated with the film in a sunshine weatherometer, and determining the reduction rate in absorbance before and after the irradiation of the film with carbon arc light for 200 hours. Specifically, when the absorbance of the film is measured before and after irradiating the film with light having a wavelength at which the absorbance of the sample becomes highest in the visible light range, the light resistance $\Delta A_L$ of the film can be expressed by the following equation:

$$\Delta A_L=(1-\Delta A_{L1}/\Delta A_{L0})\times 100 \text{ (\% unit)}$$

wherein $A_{L0}$ is the absorbance of the film before irradiation, and $A_{L1}$ is the absorbance of the film after irradiation.

Absorbance was measured by a visible ultraviolet spectrophotometer Model U-4000 manufactured by Hitachi, Ltd., Japan.

<Water Resistance Test & Hot Water Resistance Test>

The water resistance of the film obtained was evaluated by the reduction rate in specific absorptivity before and after the immersion of the bottle coated with the film in water at room temperature for one month. The hot water resistance of the film was evaluated by the reduction rate in specific absorptivity before and after the immersion of the bottle coated with the film in hot water at 90° C. for 20 minutes. Specifically, when the absorbance of the film is measured before and after the irradiation of the film with light having a wavelength at which the absorbance of the sample becomes highest in the visible light range, the water resistance $\Delta A_W$ of the film can be expressed by the following equation:

$$\Delta A_W=(1-\Delta A_{W1}/\Delta A_{W0})\times 100 \text{ (\% unit)}$$

wherein $A_{W0}$ is the absorbance of the film before immersion in water, and $A_{W1}$ is the absorbance of the film after immersion in water.

Similarly, the hot water resistance $\Delta A_H$ of the film is expressed by the following equation:

$$\Delta A_H=(1-\Delta A_{H1}/\Delta A_{H0})\times 100 \text{ (\% unit)}$$

wherein $A_{H0}$ is the absorbance of the film before immersion in hot water, and $A_{H1}$ is the absorbance of the film after immersion in hot water.

Absorbance was measured by a visible ultraviolet spectrophotometer Model U-4000 manufactured by Hitachi, Ltd., Japan.

<Abrasion Resistance Test>

A line simulator manufactured by AGR Corporation was so set that the rotational speed would be 28 rpm and that the deceleration by baffles would be 25%. This simulator was loaded with 25 coated bottles filled with tap water, and then operated.

One, two or five minutes after the start of operation, the sample bottles were visually observed, and evaluated based on the following criteria:

0: No scratch is found;

1: A small number of dot-shaped scratches are found;

2: Linear scratches are found;

3: A large number of linear scratches are found; and

4: Scratches are entirely found on the periphery of the bottle.

<Internal Pressure Resistance Test>

Internal pressure resistance test was carried out in accordance with JIS S2302 for the coated bottles that had been subjected to the abrasion resistance test carried out by using the line simulator for 1, 2 or 5 minutes, and for coated bottles not subjected to the abrasion resistance test. This test was carried out in a stepwise pressuring-progressive manner, and continued until the bottles were broken. The internal pressure resistance was evaluated by the average value (unit: $kg/cm^2$) of the test results obtained from 10 sample bottles.

<Mechanical Impact Strength Test>

Mechanical impact strength test was carried out in accordance with JIS S2303 for the bottles that had been subjected to the abrasion resistance test conducted by using the line simulator for 1, 2 or 5 minutes, and for bottles not subjected to the abrasion resistance test. The test was carried out in a progressive manner by using an impact tester manufactured by AGR Corporation, and continued until the bottles were broken. The mechanical impact strength was evaluated by the average value (unit: kgf·cm) of the test results obtained from 10 sample bottles.

Example 1

4.7 ml of vinyl ethoxysilane and 4 ml of γ-methacryloxypropyl trimethoxysilane were dissolved in 8 ml of ethanol. To this solution was added 2.0 ml of a 0.01 mol/l aqueous hydrochloric acid solution, and hydrolysis was carried out at room temperature for 1 hour to obtain Solution A.

0.36 ml of a 0.01 mol/l aqueous hydrochloric acid solution was added to 1.5 ml of tetramethoxysilane, and hydrolysis was carried out at room temperature for 1 hour to obtain Solution B.

1.9 ml of titanium tetraisopropoxide and 1.9 ml of 2-propanol were mixed with each other to give Solution C.

The above-prepared Solutions A and B were mixed. After 5 minutes, Solution C was added dropwise to this mixture. After adding the whole quantity of Solution C, the mixture was stirred for 48 hours to give a sol. This sol is hereinafter referred to as VMST Sol (I).

To 5.0 ml of this VMST Sol (I) were added 0.1 g of copper phthalocyanine and 0.01 g of "Antigel" manufactured by Schwegmann Corporation, and the mixture was stirred in a pot mill for 3 hours to give pigment-dispersed VMST Sol (I). This pigment-dispersed VMST Sol (I) was not gelled even when it was stored at room temperature for 60 days.

A glass substrate was dip-coated with pigment-dispersed VMST Sol (I). This substrate was then subjected to heat treatment in a heating furnace at 200° C. for 30 minutes in order to harden the film formed on the substrate, thereby obtaining a colored coating with a thickness of 3 micrometers. The coating had uniformly been colored, and crack and non-uniformity in color were not found at all by visual observation.

In the organic solvent resistance test, the coating remained unchanged even when it was rubbed 100 times or more with a cloth impregnated with acetone. Moreover, in the adhesion test, all of the squares were found to be remaining on the substrate.

Example 2

Pigment-dispersed VMST Sol (I) was prepared in the same manner as in Example 1. 5 ml of this sol and 0.05 g of 1-hydroxycyclohexylphenyl ketone were mixed to give a sol. A glass substrate was dip-coated with this sol, and irradiated by using two 8 W low-pressure mercury vapor lamps for one hour, the distance between the substrate and the lamps being approximately 5 cm. Thereafter, the substrate was heated at 200° C. for 30 minutes, thereby obtaining a colored coating film with a thickness of approximately 3 micrometers. The organic solvent resistance of the coating formed, and the adhesion between the coating and substrate were evaluated in the same manner as in Example 1.

In the organic solvent resistance test, the coating remained unchanged even when it was rubbed 100 times or more with a cloth impregnated with acetone. Moreover, in the adhesion test, all of the squares were found to be remaining on the substrate.

Example 3

320 g of vinyl ethoxysilane and 420 g of γ-methacryloxypropyl trimethoxysilane were dissolved in 540 g of ethanol. To this solution was added 180 g of a 0.01 mol/l aqueous hydrochloric acid solution, and hydrolysis was carried out at room temperature for 1 hour to obtain Solution D.

30 g of a 0.01 mol/l aqueous hydrochloric acid solution was added to 130 g of tetramethoxysilane, and hydrolysis was carried out at room temperature for 1 hour to obtain Solution E.

160 g of titanium tetraisopropoxide and 130 g of 2-propanol were mixed with each other to give Solution F.

The above-prepared Solutions D and E were mixed. After 5 minutes, Solution F was added dropwise to the mixture. After adding the whole quantity of Solution F, the mixture was stirred for 48 hours to give a sol. This sol is hereinafter referred to as VMST Sol (II).

To 20 parts by weight of this VMST Sol (II), 3 parts by weight of durene blue pigment, 11 parts by weight of "Antigel", and 76 parts by weight of 1-butanol were added. The mixture was stirred in a sand mill, thereby obtaining pigment-dispersed VMST Sol (II). This pigment-dispersed VMST Sol (II) was free of gelling or of increase in viscosity even when it was stored at room temperature for 6 months or more.

300-ml dual coating glass bottle W for carbonated beverages was immersed in VMST Sol (II) for coating. The coated bottle was heated in a heating furnace at 200° C. in order to harden the coating, thereby obtaining blue-colored coating bottle X coated with a glassy film having a thickness of 2 micrometers.

The organic components contained in the colored coating thus formed were equal to 50% by weight when calculated from the composition. Further, it was found that the organic component content of the whole glass bottle was 200 ppm when the thickness of the glass bottle and that of the coating were 3 mm and 2 micrometers, respectively. On the other hand, the organic component content of a conventional acrylic-resin-coated bottle (the thickness of the coating: 10 micrometers) was found to be as high as 1,000 ppm.

Evaluation 1

Non-uniformity in color, peeling and crack were not observed on the coating formed on the surface of the bottle X. The bottle X was subjected also to the above-described tests. The results were as follows:

TABLE 1

| Test Item | Results |
|---|---|
| Adhesion | 0/25 |
| Organic Solvent Resistance | >100 times |
| Light Resistance | <1% |
| Water Resistance | <1% |
| Hot Water Resistance | <1% |

The above results demonstrate the following. The coating formed on the glass bottle X according to the present invention is excellent in adhesion, organic solvent resistance and light resistance, and highly durable. It shows very small change in color when exposed to light, reveals high water and hot water resistance, and scarcely releases the colorant even when immersed in water or hot water.

Example 4

To 100 parts by weight of pigment-dispersed VMST Sol (II) were added 5 parts by weight of methyl methacrylate and 0.2 parts by weight of 2-isobutoxy-2-phenylacetophenone, and the mixture was stirred to give a sol. A 300-ml dual coating glass bottle for carbonated beverages was immersed in this sol for coating. The coated glass bottle was irradiated for 3 minutes with ultraviolet light emitted from a mercury vapor lamp of 2,800 W (80 W/cm). This bottle was then heated in a heating furnace at 200° C. for 6 minutes in order to harden the film on the bottle, thereby obtaining colored coating bottle Y coated with a glassy film with a thickness of approximately 2 micrometers. Non-uniformity in color, peeling and crack were not observed on the coating formed.

Example 5

One part by weight of a friction-reducing agent "S130" manufactured by Schwegmann corporation was added to and mixed with 100 parts by weight of pigment-dispersed VMST Sol (II) to give a sol. A 300-ml dual coating glass bottle for carbonated beverages was immersed in this sol for coating. The coated glass bottle was heated in a heating furnace at 200° C. in order to harden the film on the bottle, thereby obtaining colored coating bottle Z coated with a glassy film with a thickness of approximately 2 micrometers. Non-uniformity in color, peeling and crack were not observed on the coating formed.

Evaluation 2

The above-obtained coated glass bottles X, Y and Z, and, for comparison, non-coated 300-ml glass bottle W for carbonated beverages were subjected to the aforementioned tests for evaluation. The results obtained are as follows.

TABLE 2

| Test Item | Glass Bottle X (Example) | | | | Glass Bottle Y (Example) | | | |
|---|---|---|---|---|---|---|---|---|
| Simulator Operation Time | 0 | 1 | 2 | 5 | 0 | 1 | 2 | 5 |
| Abrasion Resistance | 0 | 0 | 1 | 2 | 0 | 0 | 1 | 2 |
| Internal Pressure Resistance | 42.3 | 41.3 | 39.4 | 41.7 | — | — | — | — |
| Mechanical Impact Strength | 13.3 | 13.2 | — | 12.7 | — | — | — | — |

| Test Item | Glass Bottle Z (Example) | | | | Glass Bottle W (Comp. Ex.) | | | |
|---|---|---|---|---|---|---|---|---|
| Simulator Operation Time | 0 | 1 | 2 | 5 | 0 | 1 | 2 | 5 |
| Abrasion Resistance | 0 | 0 | 0 | 0 | 0 | 0 | 1 | 2 |
| Internal Pressure Resistance | — | — | — | — | 34.4 | 30.2 | 26.2 | 23.3 |
| Mechanical Impact Strength | — | — | — | — | 11.2 | 10.6 | — | 8.2 |

The results shown in the above table demonstrate the following.

<Abrasion Resistance>

Glass bottle Z coated with the film containing the friction-reducing agent is free from scratches, and shows extremely high abrasion resistance. Both glass bottle X and glass bottle Y have properties comparable to those of glass bottle W (Comparative Example). In particular, glass bottle Y has properties equal to those of glass bottle X although the time spent to harden the coating on glass bottle Y is shorter than that spent to harden the coating on glass bottle X.

<Internal Pressure Resistance>

Glass bottle X is superior to comparative glass bottle W in internal pressure resistance irrespective of the simulator operation time. Further, the internal pressure resistance of glass bottle W decreased as the simulator operation time increased, while the internal pressure resistance of glass bottle X remained constant within the range of statistical scattering even when the simulator operation time was made longer.

<Mechanical Impact Strength>

Glass bottle X is superior to comparative glass bottle W in mechanical impact strength irrespective of the simulator operation time. Further, although the mechanical impact strength of glass bottle W decreased as the simulator operation time increased, that of glass bottle X remained constant within the range of statistical scattering even when the simulator operation time was made longer.

Example 6

A 500-ml polyethylene terephthalate (hereinafter referred to as PET) bottle was immersed in pigment-dispersed VMST Sol (II) in order to coat the outer surface of the bottle with the sol. The coating formed on the bottle was hardened in a thermostatic chamber at 70° C., thereby obtaining a colored coating bottle coated with a glassy film having a thickness of approximately 2 micrometers.

The oxygen permeability of the coated PET bottle obtained and that of a non-coated PET bottle were measured. The oxygen permeability of the non-coated PET bottle was 0.27, while that of the coated PET bottle was 0.22. These results demonstrate that the gas impermeability of the non-coated PET bottle was improved by the coating by approximately 20%.

Further, when the coated PET bottle was immersed in an aqueous sodium hydroxide solution (3%) at room temperature, the coating was separated from the entire surface of the bottle within 5 minutes.

Example 7

300 g of ethanol was added to and mixed with 300 g of VMST Sol (II). A 300-ml dual coating glass bottle for carbonated beverages was immersed in this sol in order to form a film on the outer surface of the bottle. Immediately after the withdrawal of the glass bottle from the coating liquid, dry air was blown by the use of a dryer on the bottle with the bottle being rotated. The coated glass bottle was then placed in an electric furnace at 200° C. for 10 minutes in order to harden the coating. The coating formed on the glass bottle entirely had a semitransparent frosty appearance, and peeling, crack and other defects were not observed at all on this coating.

What is claimed is:

1. A glassy-film-forming coating agent comprising compounds represented by the following general formulae (1), (2) and (3):

$$R^1_pSi(OR^2)_{4-p} \quad (1)$$

$$R^2(OSi(OR^2)_2)_qOR^2 \quad (2)$$

$$M(OR^3)_r \quad (3)$$

wherein $R^1$ is a polymerizable organic group having an unsaturated double bond or a ring-opening cyclic group, $R^2$ is an alkyl group having not more than 4 carbon atoms, $R^3$ is an alkyl group having not more than 6 carbon atoms, p is an integer of 1 to 3, q is an integer of 1 to 10, M is a trivalent or tetravalent metal ion, and r is an integer of 3 or 4 corresponding to the valence of M, provided that, when one of the compounds contains two or more $R^1$s, $R^2$s or $R^3$s, they may be the same or different.

2. The coating agent according to claim 1, comprising the compounds in the following proportions:

compound (1): 40 to 80 mol %, compound (2): 10 to 30 mol %, and compound (3): 10 to 50 mol %.

3. The coating agent according to claim 1, further comprising a polymerization initiator.

4. The coating agent according to claim 1, wherein $R^1$ is a vinyl or γ-methacryloxypropyl group, $R^2$ is methyl or ethyl group, $R^3$ is ethyl, methyl, isopropyl or butyl group, and M is Ti, Zr or Al.

5. The coating agent according to claim 1, wherein compound (I) is at least one member selected from the group consisting of vinyl trimethoxysilane, vinyl triethoxysilane, and γ-methacryloxypropyl trimethoxysilane.

6. The coating agent according to any of claims 1 to 2, further comprising an organic pigment, a dispersant and a solvent.

* * * * *